No. 691,453. Patented Jan. 21, 1902.
A. DIERKES.
DISH WASHER.
(Application filed June 7, 1901.)
(No Model.)

WITNESSES:
Egon Dierkes
Glen C. Stephens

INVENTOR
Alex Dierkes
BY
Rummler & Rummler
his ATTORNEYS

UNITED STATES PATENT OFFICE.

ALEX DIERKES, OF CHICAGO, ILLINOIS.

DISH-WASHER.

SPECIFICATION forming part of Letters Patent No. 691,453, dated January 21, 1902.

Application filed June 7, 1901. Serial No. 63,576. (No model.)

*To all whom it may concern:*

Be it known that I, ALEX DIERKES, a citizen of the United States of America, and a resident of Chicago, in the county of Cook and State of Illinois, have invented certain new and useful Improvements in Dish-Washers, of which the following is a specification.

The main object of my invention is to provide an improved form of dish-washer having improved means for effecting changes of water and having an independent portable receptacle adapted to receive the dishes as they are collected and to contain them during the process of cleaning and during their delivery to their place of storage, thus avoiding the necessity of rehandling. I accomplish this object by the device shown in the accompanying drawings, in which—

Figure 1:
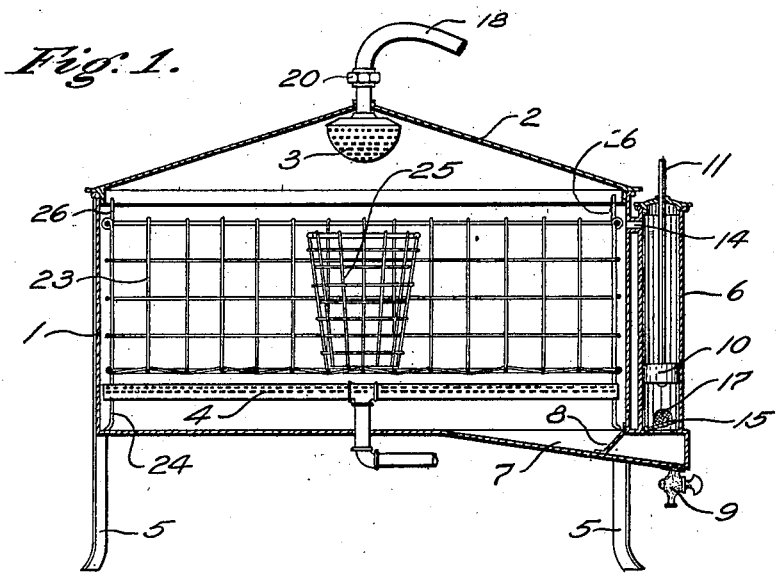
Figure 2:
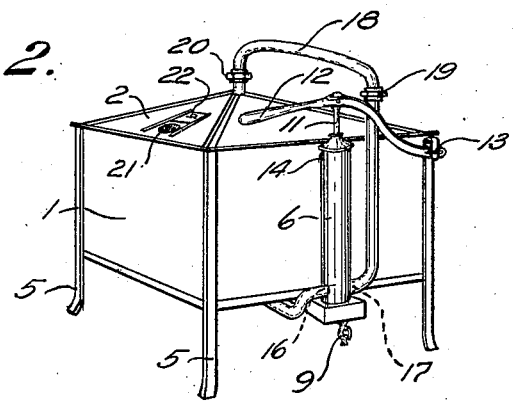

Figure 1 is a longitudinal vertical section of a dish-washer constructed according to my invention. Fig. 2 is a perspective view of the same, showing the general structure and arrangement of piping.

In the form shown my device is constructed as follows: 1 is a rectangular tank inclosed on all sides and having the removable cover 2. The cover is preferably made in the form of a pyramid and has secured in its highest part the distributing-nozzle 3. Another distributing-nozzle, preferably in the form of a perforated pipe 4, is located in the lower part of the tank, extending across the same parallel to and a little above the bottom. The legs 5 of the tank form supports for the same and extend along the vertical corners, reinforcing its side walls.

A pump 6 is secured to one end of the tank, on the outside of same. A part of the bottom of the tank is made in the form of a trough 7 to conduct the water from the tank to the base of the pump. This trough is fitted with a screen 8, so that solid particles will be strained out of the water before it reaches the pump. At the lowest part of the trough 7 is a tap 9 for drawing water from the tank. The pump 6 is a force-pump, having a piston 10, connected by the piston-rod 11 to the pumping-lever 12. The lever 12 is pivoted both to the piston-rod 11 and to one of the legs of the tank, which is bent into a crook at its upper end to form a brace for the fulcrum 13. The pump is connected at its upper part to the tank by the overflow-passage 14, which is adapted to return to the tank any water that may have leaked past the piston 10.

Water from the trough 7 is drawn into the pump-cylinder through the inlet-valve 15 and is discharged through the valves 16 and 17, the valve 17 being preferably made somewhat larger than the valve 16, so that the difference in elevation of the distributing-nozzles 3 and 4 will not cause a greater quantity of water to pass through the pipe 4 than is discharged by the nozzle 3. The pipe 18, leading from the pump to the nozzle 3, has fitted therein the unions 19 and 20, so that the cover 2 can be readily removed. The filling-port 21, provided with a slide 22 for closing same, is located in the cover 2 to allow water to be poured into the tank without necessitating the removal of the cover.

A basket 23, preferably made of wire-netting with large mesh and of suitable size to fit within the tank between the nozzles 3 and 4, is provided with legs 24, which will rest on the bottom of the tank and support the basket 23 above the pipe 4. In the middle of the basket is a compartment 25, also of wire-netting, located directly below the nozzle 3 and of such form that it may be filled with knives, forks, and similar utensils, holding them so that they rest on their ends. The basket is also provided with handles 26, by means of which it may be removed from the tank and carried from place to place.

To operate my device, the pipe 18 is disconnected at the union 19, the cover is removed, and the basket 23 is filled with dishes while it is in the tank, or it may be removed from the tank and filled at some distant point. The basket, with its load of dishes, is then placed within the tank, the cover 2 is returned to its place, and the pipe 18 secured at the union 19. A quantity of hot water and soap will be poured into the tank before attaching the cover or through the port 21 after the cover is attached. By operating the pump-lever 12 water is then drawn from the bottom of the tank and forced under pressure through the nozzles 3 and 4 against the dishes in the basket 23. By continuing to operate the pump this water is repeatedly circulated through the pump and the nozzles and against the dishes. After continuing this process for a few minutes all of the water is drawn off through the tap 9, a fresh supply is added at the port 21, if considered necessary, and the operation of the pump is repeated. All of the washing-water is next drawn off through the tap 9 and very hot clean water is supplied to the tank. A few strokes of the pump will now rinse the dishes perfectly clean. The cover may now be removed and the basket full of dishes lifted from the tank and carried to the place of storage of the dishes.

It will be seen that some of the details of the device may be altered without departing from the spirit of my invention. I therefore do not confine myself to such details, except as hereinafter limited in the claims.

What I claim as my invention, and desire to secure by Letters Patent, is—

1. A dish-washer comprising a tank having a trough-shaped extension 7 projecting from the bottom of the tank beyond one of the side walls with an outlet at its lower outer end and a valve at its upper outer end, a pump secured to the outside of said tank above the projecting part of said extension and adapted to draw water through said valve, a distributing-nozzle in the upper part of said tank and a distributing-nozzle in the lower part of said tank, each communicating with said pump above said valve, a removable cover supporting said upper nozzle, and means in said tank for removably supporting the dishes between said nozzles.

2. A dish-washer comprising a tank having a trough-shaped extension 7 projecting from the bottom of the tank beyond one of the side walls with an outlet at its lower outer end and a valve at its upper outer end, a pump secured to the outside of said tank above the projecting part of said extension and adapted to draw water through said valve, a distributing-nozzle in the upper part of said tank and a distributing-nozzle in the lower part of said tank, each communicating with said pump above said valve, said pump having at its upper part an overflow-port communicating with said tank, a removable cover supporting said upper nozzle, and means in said tank for removably supporting the dishes between said nozzles.

Signed at Chicago this 5th day of June, 1901.

ALEX DIERKES.

Witnesses:
WM. R. RUMMLER,
EGON DIERKES.